US012787104B2

(12) United States Patent
Li

(10) Patent No.: US 12,787,104 B2
(45) Date of Patent: Nov. 3, 2026

(54) LOCATION METHOD AND APPARATUS

(71) Applicant: BEIJING XIAOMI MOBILE SOFTWARE CO., LTD., Beijing (CN)

(72) Inventor: Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 332 days.

(21) Appl. No.: 18/580,102

(22) PCT Filed: Jul. 20, 2021

(86) PCT No.: PCT/CN2021/107478
§ 371 (c)(1),
(2) Date: Jan. 17, 2024

(87) PCT Pub. No.: WO2023/000185
PCT Pub. Date: Jan. 26, 2023

(65) Prior Publication Data
US 2024/0334533 A1 Oct. 3, 2024

(51) Int. Cl.
*H04W 76/27* (2018.01)
*G01S 5/02* (2010.01)

(52) U.S. Cl.
CPC ............. *H04W 76/27* (2018.02); *G01S 5/021* (2013.01)

(58) Field of Classification Search
CPC ....... H04W 76/27; H04W 4/02; H04W 64/00; H04W 88/18; G01S 5/021
USPC ....................................................... 455/456.2
See application file for complete search history.

(56) References Cited

U.S. PATENT DOCUMENTS

| | | | | |
|---|---|---|---|---|
| 12,041,578 | B2 * | 7/2024 | Edge | H04W 4/029 |
| 12,519,507 | B2 * | 1/2026 | Duan | H04B 7/04013 |
| 12,628,114 | B2 * | 5/2026 | Li | H04L 5/0053 |
| 2020/0137715 | A1 | 4/2020 | Edge et al. | |
| 2021/0337501 | A1 * | 10/2021 | Si | H04W 4/021 |
| 2022/0225145 | A1 * | 7/2022 | Wu | H04L 5/0051 |
| 2023/0336309 | A1 * | 10/2023 | Zhuang | G01S 5/00 |
| 2024/0022381 | A1 * | 1/2024 | Yu | H04L 5/0048 |
| 2024/0056129 | A1 * | 2/2024 | Duan | H04B 7/04013 |

FOREIGN PATENT DOCUMENTS

| | | | |
|---|---|---|---|
| CN | 111132307 | A | 5/2020 |
| CN | 111586742 | A | 8/2020 |
| WO | WO 2020168573 | A1 | 8/2020 |

OTHER PUBLICATIONS

Zhenxian Hu et al. (NB-IoT Network Monitoring and Diagnosing; IEEE, published 2019, 9 pages) (Year: 2019).*
European Patent Application No. 21950449.5, Search Report dated Jul. 16, 2024, 18 pages.

(Continued)

*Primary Examiner* — Hirdepal Singh
(74) *Attorney, Agent, or Firm* — Cozen O'Connor

(57) ABSTRACT

The method includes: receiving an instruction for activating or deactivating an uplink positioning reference signal sent by a location management function (LMF); and sending an activation command or a deactivation command to a terminal in a radio resource control (RRC) non-connected state based on the instruction for activating or deactivating the uplink positioning reference signal.

13 Claims, 4 Drawing Sheets

(56) References Cited

OTHER PUBLICATIONS

Huawei, HiSilicon (Rapporteur of Summary); "Summary of AI 8.11.3 for Inactive POS"; 3GPP TSG-RAN WG2 Meeting #114-e; R2-2106447; May 2021, 21 pages.

PCT/CN2021/107478 International Search Report dated Dec. 17, 2021, 3 pages.

* cited by examiner

LOCATION METHOD AND APPARATUS

CROSS-REFERENCE TO RELATED APPLICATION

This application is a U.S. national phase of International Application No. PCT/CN2021/107478, filed with the State Intellectual Property Office of P. R. China on Jul. 20, 2021, the entire content of which is incorporated herein by reference.

TECHNICAL FIELD

The present disclosure relates to a field of wireless communication technology, and particularly to a positioning method and apparatus.

BACKGROUND

At present, in the new radio (NR) system of the 5th generation (future 5th generation, 5G) communication technology, more than one positioning technology is introduced for use in determining the position of a terminal device.

In the related art, positioning of the terminal device in a radio resource control (RRC) non-connected state is proposed. A network side device configures an uplink positioning reference signal for the terminal device in the RRC non-connected state according to a positioning information request sent by a location management function (LMF) device.

SUMMARY

Embodiments of the present disclosure provide a positioning method and apparatus.

According to a first aspect, an embodiment of the present disclosure provides a positioning method. The method is applied to a network device, and includes: receiving an instruction for activating or deactivating an uplink positioning reference signal sent by an LMF; and sending an activation command or a deactivation command to a terminal in an RRC non-connected state based on the instruction for activating or deactivating the uplink positioning reference signal.

According to a second aspect, an embodiment of the present disclosure provides another positioning method, the method is applied to a network device, and the method includes: receiving a positioning information request message sent by an LMF for instructing or requesting the network device to configure an uplink positioning reference signal for a terminal; configuring the uplink positioning reference signal for the terminal based on the positioning information request message; in response to failing to configure the uplink positioning reference signal for the terminal within a preset duration, sending a second error indication message to the LMF, in which the uplink positioning reference signal is applied to a terminal in an RRC non-connected state.

According to a third aspect, an embodiment of the present disclosure provides another positioning method, the method is applied to a terminal, and the method includes: in a case that the terminal is in an RRC non-connected state, receiving an activation command or a deactivation command sent by a network device; and activating or deactivating an uplink positioning reference signal based on the activation command or the deactivation command.

BRIEF DESCRIPTION OF THE DRAWINGS

In order to clearly illustrate technical solutions of embodiments of the disclosure or background technologies, the accompanying drawings used in the embodiments or the background technologies will be explained below.

DETAILED DESCRIPTION

Figure 1:
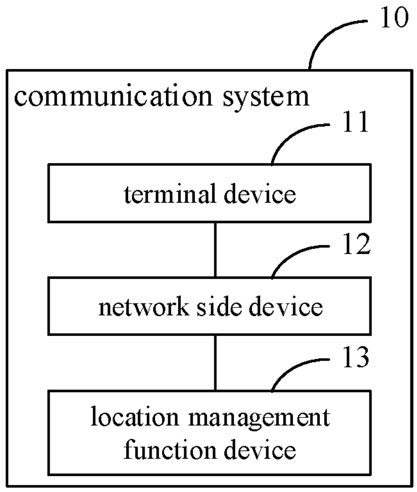
FIG. 1 is a schematic diagram of a communication system according to an embodiment of the present disclosure.

In order to better understand the positioning method and apparatus disclosed in embodiments of the present disclosure, a communication system applicable to the embodiments of the present disclosure is described below.

The technical solutions of the embodiments of the present disclosure may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5G system or a new radio, and the like.

A terminal device in the embodiments of the present disclosure may refer to a user equipment (UE), an access terminal, a user unit, a user station, a mobile station, a mobile platform, a remote station, a remote terminal, a mobile device, a user terminal, a terminal, a wireless communication device, a user agent, or a user device. The terminal may also be a cellular phone, a cordless telephone, a session initiation protocol (SIP) phone, a wireless local loop (WLL) station, a personal digital assistant (PDA), a handheld device having a wireless communication function, a computing device or other processing device connected to a wireless modem, a vehicle-mounted device, a wearable device, a terminal in a future 5G network, or a terminal in a future evolved public land mobile network (PLMN), and the like, which is not limited in the embodiments of the present disclosure.

A network side device in the embodiments of the present disclosure may be a device for communicating with the terminal device. The network side device may be a base transceiver station (BTS) in a GSM system or a CDMA system, or may be a NodeB (NB) in a WCDMA system, or may be an evolved NodeB (eNB or eNodeB) in an LTE system, or may be a wireless controller in a cloud radio access network (CRAN) scenario, or the network side device may be a relay station, an access point, a vehicle-mounted device, a wearable device, or a network side device, such as gNodeB (gNB) in the future 5G network, or a network side device in a future evolved PLMN network, and the like, which is not limited in the embodiments of the present disclosure.

In the embodiments of the present disclosure, the terminal device or the network side device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing via processes, such as a Linux operating system, a Unix operating system, an Android operating system, an iOS operating system, or a Windows operating system. The application layer includes applications such as a browser, an address book, a text processing software, and an instant messaging software. Moreover, in the embodiments of the present disclosure, a specific structure of an execution body of any of the methods provided in the embodiments of the disclosure is not specifically limited, as long as the execution body can perform a communication according to any of the methods provided in the embodiments of the disclosure by running a program that records the code of the method. For example, the execution body of any of the methods provided in the embodiments of the disclosure can be the terminal device or the network side device, or a functional module in the terminal device or the network side device that can call the program and execute the program.

Referring to FIG. 1, FIG. 1 is a schematic diagram of a possible communication system 10 appliable to the present disclosure.

As shown in FIG. 1, the communication system 10 includes a terminal device (TD) 11, a network side device 12, and a location management function device 13, which are respectively described below.

1. The terminal device 11 is referred to as a terminal for short, which is a device having a wireless transceiving function, may include all kinds of handheld devices, vehicle-mounted devices, wearable devices, computing devices having the wireless communication function, or other processing devices connected to the wireless modem, and various forms of terminals, such as a mobile station (MS), a terminal, a user equipment (UE), a soft terminal, and the like. The terminal may be deployed on land, including indoor or outdoor, handheld, or vehicle-mounted, may also be deployed above a water surface (such as a ship, etc.), or may also be deployed in the air (for example, an aircraft, a balloon, a satellite, etc.), for example, a mobile phone, a pad, a computer with the wireless transceiving function, a virtual reality (VR) terminal, an augmented reality (AR) terminal, a wireless terminal in an industrial control, a wireless terminal in self driving, a wireless terminal in remote medical, a wireless terminal in a smart grid, a wireless terminal in transportation safety, a wireless terminal in a smart city, a wireless terminal in a smart home, and the like.

2. The (radio) network (radio access network, (R)AN) side device 12 is a device for providing the wireless communication function for the terminal, including but not limited to a gNB in 5G, an eNB, a radio network controller (RNC), a node B (NB), a base station controller (BSC), a base transceiver station (BTS), a home base station (e.g., home evolved nodeB or home node B (HNB), a baseBand unit (BBU)), a transmitting and receiving point (TRP), a transmitting point (TP), and the like.

3. The location management function device 13 is referred to as a location management network element, and is configured to perform a location management of the terminal device 11, for example, determine location information of a UE. Specifically, the location management function device in the 5G wireless communication system may be a location management function (LMF) device. The LMF device may determine the location information of the UE according to a request of a core network entity (such as an access and mobility management function (AMF)), and provide the location information of the UE to the AMF, thereby providing location service (LCS). In an implementation, the AMF may allocate at least one LMF to the UE for providing the location service to the UE. When the UE needs to obtain positioning information, the UE may request the location information from the LMF through the AMF. In future communications (for example, 6G or other networks), the location management network element may still be an LMF network element, or a network element having other names, which is not limited in the present disclosure.

It should be noted that a function device involved in the embodiments of the present disclosure may also be referred to as a network element or a function or a functional entity, for example, the location management function device may also be referred to as a location management function or a location management function entity or a location management network element. Names of function devices are not limited in the present disclosure, and those skilled in the art may replace the names of the function devices with other names but perform same functions, which may fall within the protection scope of the present disclosure.

It may be understood that the function device may be a network element in a hardware device, or may be a software function running on a dedicated hardware, or a virtualization function instantiated on a platform (for example, a cloud platform).

It may be understood that the communication system described in the embodiments of the present disclosure is intended to explain the technical solutions of the embodiments of the present disclosure more clearly, and does not constitute a limitation to the technical solutions provided in the embodiments of the present disclosure. Those ordinary skilled in the art know that, with the evolution of the system architecture and the emergence of new business scenarios, the technical solutions provided in the embodiments of the present disclosure are equally applied to similar technical problems.

The positioning method and apparatus provided in the present disclosure are described in detail below with reference to the accompanying drawings.

Figure 2:
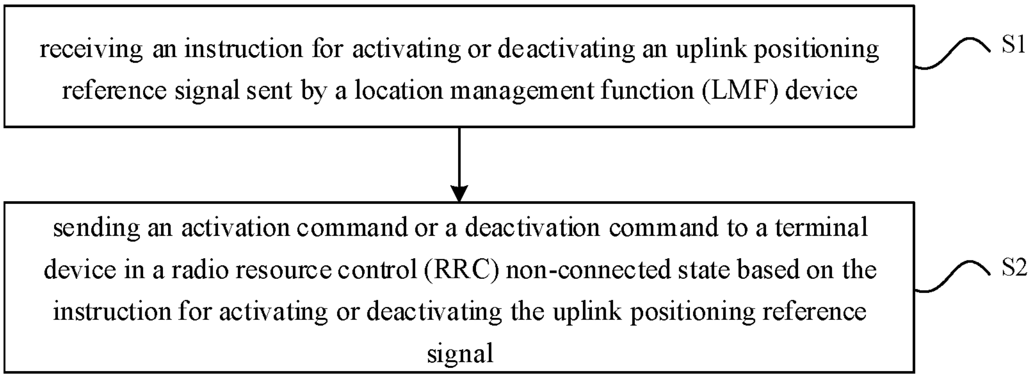
FIG. 2 is a flowchart of a positioning method applied to a network side device according to an embodiment of the present disclosure.

Referring to FIG. 2, FIG. 2 is a flowchart of a positioning method according to an embodiment of the present disclosure.

As shown in FIG. 2, the method is applied to a network side device, and the method may include, but is not limited to, the following steps.

S1: an instruction for activating or deactivating an uplink positioning reference signal sent by an LMF device is received.

In an uplink positioning technology, the network side device configures the uplink positioning reference signal for a terminal device. In a case that the uplink positioning reference signal is an aperiodic or semi-persistent signal, in order to position the terminal device, the uplink positioning reference signal needs to be activated or deactivated.

Specifically, in the case that the terminal device is in an radio resource control (RRC) connected state, the network side device may enable the terminal device to activate or deactivate the uplink positioning reference signal by sending a medium access control (MAC) message or a downlink control information (DCI) message. In the case that the uplink positioning reference signal is an aperiodic signal, the network side device may enable the terminal device to activate or deactivate the uplink positioning reference signal by sending the DCI message. In the case that the uplink positioning reference signal is the semi-persistent signal, the network side device may enable the terminal device to activate or deactivate the uplink positioning reference signal by sending the MAC message.

S2: an activation command or a deactivation command is sent to the terminal device in an RRC non-connected state based on the instruction for activating or deactivating the uplink positioning reference signal.

The RRC non-connected state specifically includes an RRC idle state/RRC inactive state.

In the embodiment of the present disclosure, the network side device receives the instruction for activating or deactivating the uplink positioning reference signal sent by the LMF device, and sends the activation command or the deactivation command to the terminal device in the RRC non-connected state according to the instruction for activating or deactivating the uplink positioning reference signal.

Specifically, in the case that the terminal device is in the RRC non-connected state, in the embodiment of the present disclosure, the network side device may send the activation command or the deactivation command to the terminal device, so that the terminal device may activate or deactivate the uplink positioning reference signal to position the terminal device.

By implementing the embodiment of the present disclosure, after receiving the instruction for activating or deactivating the uplink positioning reference signal sent by the LMF device, the network side device sends the activation command or the deactivation command to the terminal device in the RRC non-connected state according to the instruction for activating or deactivating the uplink positioning reference signal, so that the terminal device in the RRC non-connected state may receive the activation command or the deactivation command sent by the network side device, so as to activate or deactivate the uplink positioning reference signal, thereby positioning the terminal device.

Figure 3:
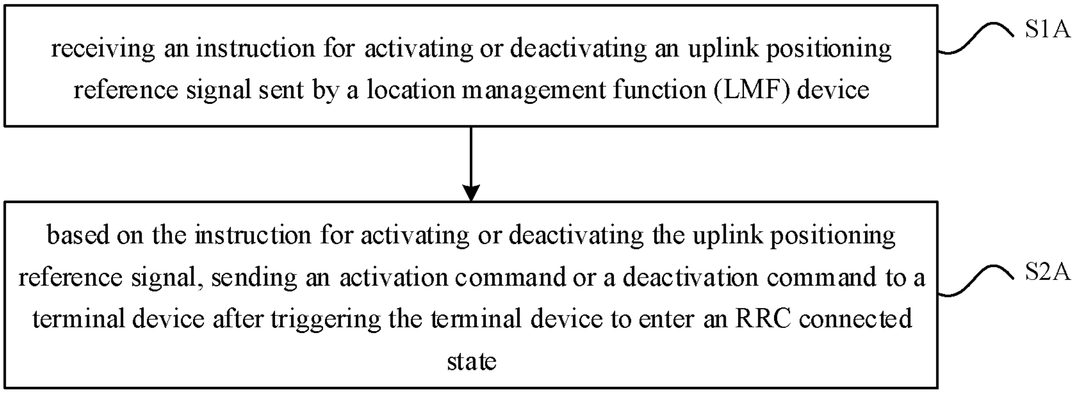
FIG. 3 is a flowchart of a positioning method according to another embodiment of the present disclosure.

Referring to FIG. 3, FIG. 3 is a flowchart of a positioning method according to another embodiment of the present disclosure.

As shown in FIG. 3, the method is applied to a network side device, and the method may include, but is not limited to, the following steps.

S1A: an instruction for activating or deactivating an uplink positioning reference signal sent by an LMF device is received.

S1A has the same or similar technical effects as S1 in the above embodiment, and the description of the specific implementation of S1A may refer to the description of the specific implementation of S1 in the foregoing embodiment, and details are not described herein again.

S2A: based on the instruction for activating or deactivating the uplink positioning reference signal, an activation command or a deactivation command is sent to a terminal device after triggering the terminal device to enter an RRC connected state.

It may be understood that when the terminal device is in an RRC non-connected state, in general, the network side device cannot directly send the activation or deactivation command of the uplink positioning reference signal to the terminal device.

Based on this, in the embodiments of the present disclosure, in the case that the terminal device is in the RRC non-connected state, the network side device triggers the terminal device to enter the RRC connected state, and sends the activation command or the deactivation command to the terminal device. In this case, the terminal device may receive the activation command or the deactivation command, so as to activate or deactivate the uplink positioning reference signal to position the terminal device.

It may be understood that in the embodiment of the present disclosure, after the network side device triggers the terminal device to enter the RRC connected state, the network side device may enable the terminal device to activate or deactivate the uplink positioning reference signal by sending a MAC message or a DCI message. In the case that the uplink positioning reference signal is an aperiodic signal, the network side device may enable the terminal device to activate or deactivate the uplink positioning reference signal by sending the DCI message. In the case that the uplink positioning reference signal is a semi-persistent signal, the network side device may enable the terminal device to activate or deactivate the uplink positioning reference signal by sending the MAC message.

In an exemplary embodiment, sending the activation command or the deactivation command to the terminal device in the RRC non-connected state further includes: in a case that the terminal device does not have an ongoing uplink small data transmission (SDT), sending the activation command or the deactivation command to the terminal device after the network side device triggers the terminal device to enter the RRC connected state.

In the case that the terminal device does not have the ongoing uplink SDT, the network side device cannot directly send the activation or deactivation command to the terminal device. Therefore, the network side device needs to trigger the terminal device to enter the RRC connected state, and sends the activation command or the deactivation command to the terminal device. A specific way to send the activation command or the deactivation command may refer to the above related discussion of sending the activation command or the deactivation command to the terminal device after the network side device triggers the terminal device to enter the RRC connected state, which will not be repeated here.

In some embodiments, after the activation command or the deactivation command is sent to the terminal device in the RRC non-connected state after triggering the terminal device to enter the RRC connected state in the embodiment of the present disclosure, the network side device controls the terminal device to be in the RRC non-connected state.

It can be understood that when the terminal device is in the RRC non-connected state, power consumption of the terminal device can be reduced. In the embodiments of the present disclosure, after triggering the terminal device to enter the RRC connected state and sending the activation command or the deactivation command to the terminal device, the network side device controls the terminal device to be in the RRC non-connected state, which can reduce the power consumption of the terminal device and further save energy.

Figure 4:
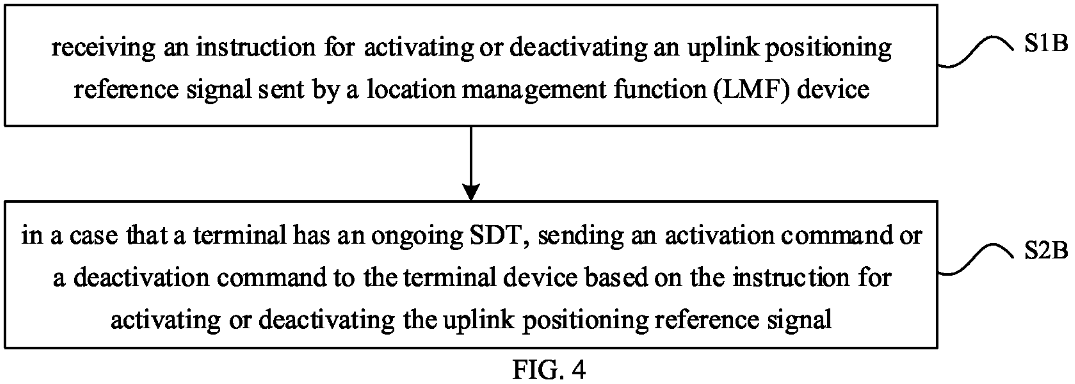
FIG. 4 is a flowchart of a positioning method according to another embodiment of the present disclosure.

Referring to FIG. 4, FIG. 4 is a flowchart of a positioning method according to another embodiment of the present disclosure.

As shown in FIG. 4, the method is applied to a network side device, and the method may include, but is not limited to, the following steps.

S1B: an instruction for activating or deactivating an uplink positioning reference signal sent by an LMF device is received.

S1B has the same or similar technical effects as S1 in the above embodiment, and the description of the specific implementation of SIB may refer to the description of the specific implementation of S1 in the foregoing embodiment, and details are not described herein again.

S2B: in a case that a terminal device has an ongoing SDT, an activation command or a deactivation command is sent to the terminal device according to the instruction for activating or deactivating the uplink positioning reference signal.

It may be understood that when the terminal device is in an RRC non-connected state, in general, the network side device cannot directly send the activation or deactivation command of the uplink positioning reference signal to the terminal device. However, in the case that the terminal device has the ongoing uplink SDT, the terminal device may send uplink data. In this case, the network device may also directly send downlink data to the terminal device. For example, the terminal device may receive a MAC message or a DCI message sent by the network side device to the terminal device.

Based on this, in the case that the uplink positioning reference signal is an aperiodic or semi-persistent signal, the network side device may directly send the activation command or the deactivation command to the terminal device in the RRC non-connected state through the DCI or the MAC message, so that the terminal device activates or deactivates the uplink positioning reference signal.

In the embodiment of the present disclosure, in the case that the terminal device has the ongoing uplink SDT, the activation command or the deactivation command (for example, the MAC message or the DCI message) is sent to the terminal device, so that the terminal device may activate or deactivate the uplink positioning reference signal to position the terminal device. Further, in the case that the terminal device has the ongoing uplink SDT, the activation command or the deactivation command is directly sent to the terminal device in the RRC non-connected state, and there is no need for the network side device to send the activation command or the deactivation command after the network side device sends an instruction related to entering the RRC connection state to the terminal device and the terminal device is in the RRC connected state, so that the delay can be further reduced, and the uplink positioning reference signal can be quickly activated or deactivated.

Figure 5:
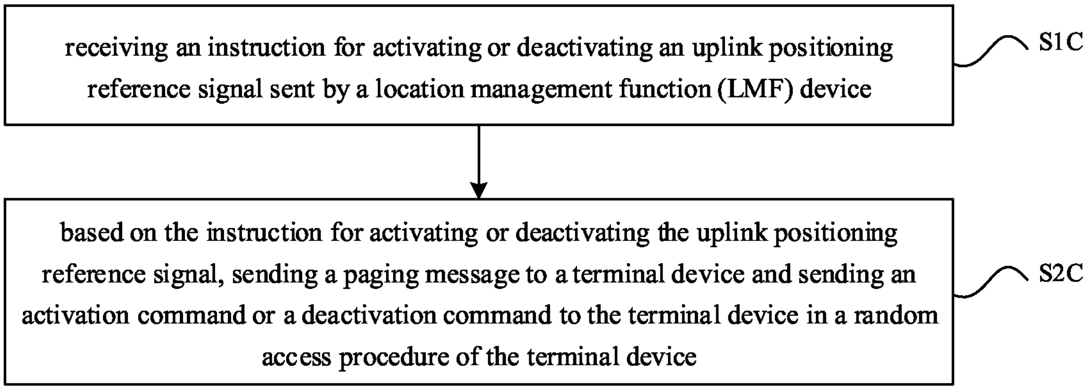
FIG. 5 is a flowchart of a positioning method according to another embodiment of the present disclosure.

Referring to FIG. 5, FIG. 5 is a flowchart of a positioning method according to another embodiment of the present disclosure.

As shown in FIG. 5, the method is applied to a network side device, and the method may include, but is not limited to, the following steps.

S1C: an instruction for activating or deactivating an uplink positioning reference signal sent by an LMF device is received.

S1C has the same or similar technical effects as S1 in the above embodiment, and the description of the specific implementation of SIC may refer to the description of the specific implementation of S1 in the foregoing embodiment, and details are not described herein again.

S2C: a paging message is sent to a terminal device based on the instruction for activating or deactivating the uplink positioning reference signal, and an activation command or a deactivation command is sent to the terminal device in a random access procedure of the terminal device.

It may be understood that when the terminal device is in an RRC non-connected state, in general, the network side device cannot directly send the activation command or deactivation command of the uplink positioning reference signal to the terminal device.

Based on this, in the embodiment of the present disclosure, the paging message is sent to the terminal device, and in the random access procedure of the terminal device, the activation command or the deactivation command is sent to the terminal device, so that the terminal device activates or deactivates the uplink positioning reference signal, so as to position the terminal device. In this process, there is no need to send the activation command or the deactivation command after the terminal device is in the RRC connected state, so that the delay can be further reduced, and the uplink positioning reference signal can be quickly activated or deactivated.

In an exemplary embodiment, in the random access procedure of the terminal device, the network side device may send the activation command or the deactivation command to the terminal device through a random access message 2/random access message 4 (MSG2 or MSG4), or the network side device may send the activation command or the deactivation command to the terminal device through a random access message B (MSGB).

In the embodiments of the present disclosure, in a 2-step random access procedure, the network side device sends the activation command or the deactivation command to the terminal device through the MSGB. In the embodiments of the present disclosure, in a 4-step random access procedure, the network side device sends the activation command or the deactivation command to the terminal device through the MSG2 or MSG4.

In an exemplary embodiment, sending the activation command or the deactivation command to the terminal device in the RRC non-connected state further includes: in a case that the terminal device does not have an ongoing uplink SDT, sending the paging message to the terminal device, and sending the activation command or the deactivation command to the terminal device in the random access procedure of the terminal device.

In the case that the terminal device does not have the ongoing uplink SDT, the network side device cannot directly send a command for activating or deactivating the uplink positioning reference signal to the terminal device, so that the paging message is sent to the terminal device, and the network side device sends the activation command or the deactivation command to the terminal device in the random access procedure of the terminal device. A specific manner in which the network side device sends the activation command or the deactivation command to the terminal device may refer to the above related discussion of the network side device sending the paging message to the terminal device and sending the activation command or the deactivation command to the terminal device in the random access procedure of the terminal device, which will not be repeated here.

In some embodiments, the network side device sends the paging message to the terminal device, and in the random access procedure of the terminal device, the network side device controls the terminal device to be in the RRC non-connected state after sending the activation command or the deactivation command to the terminal device.

It can be understood that when the terminal device is in the RRC non-connected state, power consumption of the terminal device can be reduced. In the embodiment of the present disclosure, the network side device sends the paging message to the terminal device, and in the random access procedure of the terminal device, the network side device controls the terminal device to be in the RRC non-connected state after sending the activation command or the deactivation command to the terminal device, which can reduce the power consumption of the terminal device and further save energy.

In some embodiments, before receiving the instruction for activating or deactivating the uplink positioning reference signal sent by the LMF device, the method further includes: receiving an indication message sent by the LMF device; and configuring the uplink positioning reference signal for the terminal device based on the indication message. The uplink positioning reference signal is an aperiodic or semi-persistent signal.

In the embodiments of the present disclosure, the LMF device sends the indication message to the network side device through a new radio positioning protocol A (NRPPa) message. The indication message may be a positioning information request message, and the indication message instructs or requests the network side device to configure the uplink positioning reference signal for the terminal device, for example, the indication information is included in a positioning information request message.

The uplink positioning reference signal configured for the terminal device by the network side device is the aperiodic or semi-persistent signal, so that when the terminal device is positioned, the uplink positioning reference signal is used, and the uplink positioning reference signal needs to be activated or deactivated. Then the instruction for activating or deactivating the uplink positioning reference signal sent by the LMF device is received in the embodiment of the present disclosure.

In some embodiments, the indication message includes a preset duration. The preset duration is a longest time period required by the network side device to successfully configure the uplink positioning reference signal for the terminal device.

The preset duration is included in the positioning information request message.

In the embodiment of the present disclosure, the indication message sent by the LMF device includes the preset duration, so as to limit the time required by the network side device to configure the uplink positioning reference signal for the terminal device, so that when the time used by the network side device to configure the uplink positioning reference signal for the terminal device exceeds the preset duration, a corresponding operation can be performed to achieve a certain function.

In some embodiments, if the network side device fails to configure the uplink positioning reference signal for the terminal device within the preset duration, the network side device sends a first error indication message to the LMF device.

The network side device receives the indication message sent by the LMF device, and configures the uplink positioning reference signal for the terminal device. The terminal device is in the RRC non-connected state. In the embodiments of the present disclosure, the network side device configures the uplink positioning reference signal for the terminal device through an RRC release message, in a case that the terminal device is in the RRC connected state for a long time, the network side device may not successfully configure the uplink positioning reference signal for the terminal device. In this case, the network side device sends a first error indication message to the LMF device.

In the embodiments of the present disclosure, when the network side device fails to configure the uplink positioning reference signal for the terminal device within the preset duration, the first error indication message is sent to the LMF device to notify the LMF device that the network side device fails to configure the uplink positioning reference signal for the terminal device, so that the LMF device can know a result that the network side device fails to configure the uplink positioning reference signal for the terminal device, or send some instructions for executing other operations in the case that the result is known, so as to solve a problem that the network side device fails to configure the uplink positioning reference signal for the terminal device.

In some embodiments, the first error indication message includes a cause value. The cause value indicates that the terminal device does not enter the RRC non-connected state within the preset duration.

The cause value is included in a positioning information failure message.

Figure 6:
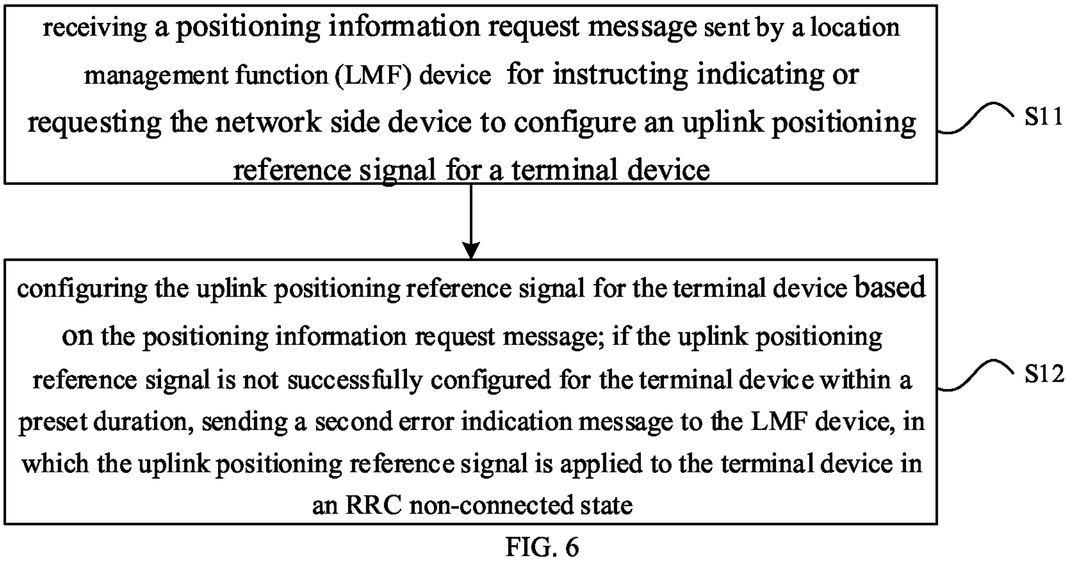
FIG. 6 is a flowchart of a positioning method according to another embodiment of the present disclosure.

Referring to FIG. 6, FIG. 6 is a flowchart of a positioning method according to another embodiment of the present disclosure.

As shown in FIG. 6, the positioning method is applied to a network side device, and the method may include, but is not limited to, the following steps.

S11: a positioning information request message sent by an LMF device for instructing or requesting the network side device to configure an uplink positioning reference signal for a terminal device is received.

In the embodiment of the present disclosure, the LMF device sends the positioning information request message to the network side device through a NRPPa message. The positioning information request message instructs or requests the network side device to configure the uplink positioning reference signal for the terminal device.

S12: the uplink positioning reference signal is configured for the terminal device based on the positioning information request message; if the uplink positioning reference signal is not successfully configured for the terminal device within a preset duration, a second error indication message is sent to the LMF device. The uplink positioning reference signal is applied to a terminal device in an RRC non-connected state.

In the embodiment of the present disclosure, after the network side device receives the positioning information request message sent by the LMF device for instructing or requesting the network side device to configure the uplink positioning reference signal for the terminal device, the network side device configures the uplink positioning reference signal for the terminal device.

The uplink positioning reference signal is applied to the terminal device in the RRC non-connected state. In the embodiment of the present disclosure, the network side device configures the uplink positioning reference signal for the terminal device through an RRC release message, in a case that the terminal device is in an RRC connected state for a long time, e the network side device may not successfully configure the uplink positioning reference signal for the terminal device. In this case, the network side device sends a second error indication message to the LMF device.

In the embodiment of the present disclosure, if the network side device fails to configure the uplink positioning reference signal for the terminal device within the preset duration, the second error indication message is sent to the LMF device to notify the LMF device that the network side device fails to configure the uplink positioning reference signal for the terminal device, so that the LMF device may know a result that the network side device fails to configure the uplink positioning reference signal for the terminal device, or send some instructions for executing other operations in the case that the result is known, so as to solve the problem that the network side device fails to configure the uplink positioning reference signal for the terminal device.

In some embodiments, the second error indication message includes a cause value. The cause value indicates that the terminal device does not enter the RRC non-connected state within the preset duration.

The cause value is included in a positioning information failure message.

Figure 7:
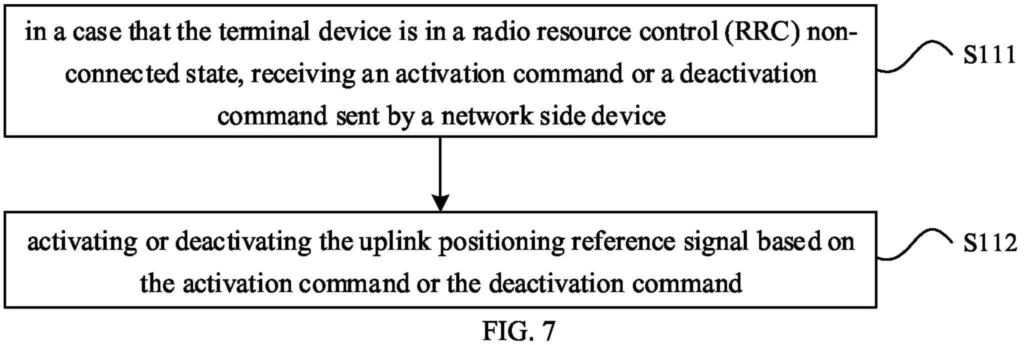
FIG. 7 is a flowchart of a positioning method applied to a terminal device according to another embodiment of the present disclosure.

Referring to FIG. 7, FIG. 7 is a flowchart of a positioning method according to another embodiment of the present disclosure.

As shown in FIG. 7, the positioning method is applied to a terminal device, and the method may include, but is not limited to, the following steps.

S111: in a case that the terminal device is in an RRC non-connected state, an activation command or a deactivation command sent by a network side device is received.

The RRC non-connected state specifically includes an RRC idle state/RRC inactive state.

In an uplink positioning technology, the network side device configures the uplink positioning reference signal for the terminal device. In a case that the uplink positioning reference signal is an aperiodic or semi-persistent signal, in order to position the terminal device, the uplink positioning reference signal needs to be activated or deactivated.

Specifically, in the case that the terminal device is in an RRC connected state, the network side device may enable the terminal device to activate or deactivate the uplink positioning reference signal by sending a medium access control (MAC) message or a downlink control information (DCI) message. In the case that the uplink positioning reference signal is an aperiodic signal, the network side device may enable the terminal device to activate or deactivate the uplink positioning reference signal by sending the DCI message. In the case that the uplink positioning reference signal is the semi-persistent signal, the network side device may enable the terminal device to activate or deactivate the uplink positioning reference signal by sending the MAC message.

It may be understood that when the terminal device is in an RRC non-connected state, in general, the network side device cannot directly send the activation or deactivation command of the uplink positioning reference signal to the terminal device. However, in the embodiments of the present disclosure, in the case that the terminal device is in the RRC non-connected state, the activation command or the deactivation command may be received.

S112: an uplink positioning reference signal is activated or deactivated based on the activation command or the deactivation command.

In the embodiment of the present disclosure, in the case that the terminal device is in the RRC non-connected state, the activation command or the deactivation command sent by the network side device is received, so that the terminal device may activate or deactivate the uplink positioning reference signal according to the activation command or the deactivation command, so as to position the terminal device.

By implementing the embodiment of the present disclosure, in the case that the terminal device is in the RRC non-connected state, the activation command or the deactivation command sent by the network side device is received, and the terminal device activates or deactivates the uplink positioning reference signal according to the activation command or the deactivation command, so that the terminal device in the RRC non-connected state may activate or deactivate the uplink positioning reference signal after receiving the activation command or the deactivation command sent by the network side device, so as to position the terminal device.

Figure 8:
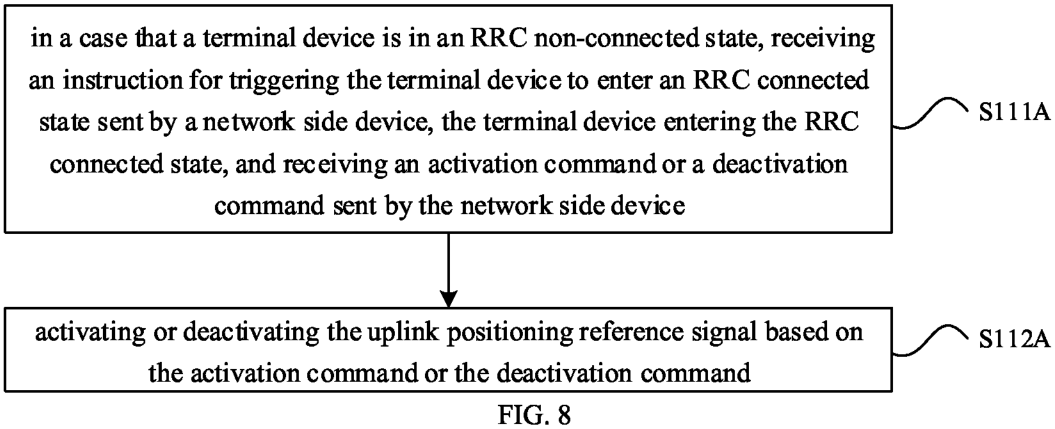
FIG. 8 is a flowchart of a positioning method according to another embodiment of the present disclosure.

Referring to FIG. 8, FIG. 8 is a flowchart of a positioning method according to another embodiment of the present disclosure.

As shown in FIG. 8, the method is applied to a terminal device, and the method may include, but is not limited to, the following steps.

S111A: in a case that the terminal device is in an RRC non-connected state, an instruction for triggering the terminal device to enter an RRC connected state sent by a network side device is received, the terminal device enters the RRC connected state and receives an activation command or a deactivation command sent by the network side device.

It may be understood that when the terminal device is in the RRC non-connected state, in general, the network side device cannot directly send the activation or deactivation command of the uplink positioning reference signal to the terminal device. Based on this, in the embodiments of the present disclosure, in the case that the terminal device is in the RRC non-connected state, the terminal device receives the instruction for triggering the terminal device to enter the RRC connected state sent by the network side device. The terminal device enters the RRC connected state, and receives the activation command or the deactivation command sent by the network side device. In this case, the terminal device may receive the activation command or the deactivation command, so as to activate or deactivate the uplink positioning reference signal to position the terminal device.

It may be understood that in the embodiments of the present disclosure, after the terminal device receives the instruction for triggering the terminal device to enter the RRC connected state sent by the network side device and enters the RRC connected state, the network side device may send a MAC message or a DCI message, to enable the terminal device to activate or deactivate the uplink positioning reference signal. In the case that the uplink positioning reference signal is an aperiodic signal, the terminal device receives the DCI message sent by the network side device, and activates or deactivates the uplink positioning reference signal. In the case that the uplink positioning reference signal is a semi-persistent signal, the terminal device receives the MAC message sent by the network side device, and activates or deactivates the uplink positioning reference signal.

In an exemplary embodiment, sending the activation command or the deactivation command to the terminal device further includes: in a case that the terminal device does not have an ongoing uplink SDT, the terminal device receiving the instruction for triggering the terminal device to enter the RRC connected state sent by the network side device, entering the RRC connected state, and receiving the activation command or the deactivation command sent by the network side device.

S112A: an uplink positioning reference signal is activated or deactivated based on the activation command or the deactivation command.

S112A has the same or similar technical effects as S112 in the above embodiment, and the description of the specific implementation of S112A may refer to the description of the specific implementation of S112 in the foregoing embodiment, and details are not described herein again.

Figure 9:
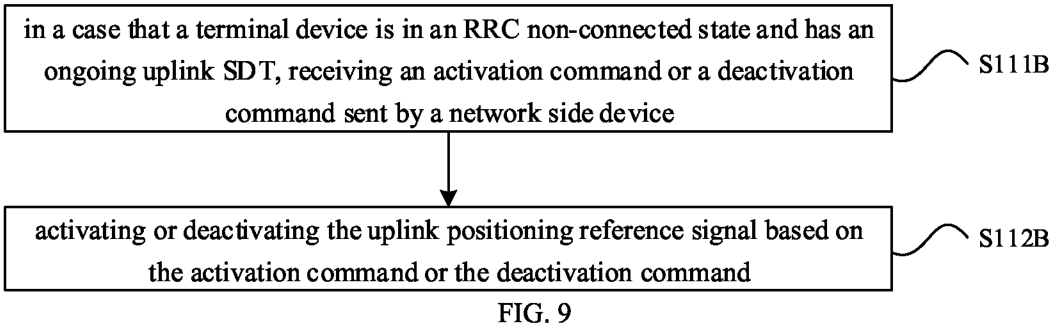
FIG. 9 is a flowchart of a positioning method according to another embodiment of the present disclosure.

Referring to FIG. 9, FIG. 9 is a flowchart of a positioning method according to another embodiment of the present disclosure.

As shown in FIG. 9, the method is applied to a terminal device, and the method may include, but is not limited to, the following steps.

S111B: in a case that the terminal device is in an RRC non-connected state and has an ongoing uplink SDT, an activation command or a deactivation command sent by a network side device is received.

It may be understood that when the terminal device is in the RRC non-connected state, in general, the network side device cannot directly send the activation command or deactivation command of the uplink positioning reference signal to the terminal device. However, in the case that the terminal device has the ongoing uplink SDT, the terminal device may send uplink data. In this case, the network device may also directly send downlink data to the terminal device. For example, the terminal device may receive a MAC message or a DCI message sent by the network side device.

Based on this, the terminal device may receive the DCI message or the MAC message sent by the network side device, and activate or deactivate the uplink positioning reference signal.

In the embodiment of the present disclosure, in the case that the terminal device has the ongoing uplink SDT, the activation command or the deactivation command (for example, the MAC message or the DCI message) sent by the network side device is received, so that the terminal device may activate or deactivate the uplink positioning reference signal, so as to position the terminal device. Moreover, in the case that the terminal device has the ongoing uplink SDT, the terminal device in the RRC non-connected state directly receives the activation command or the deactivation command sent by the network side device, it is not necessary for the terminal device to switch to the RRC connected state after receiving a relevant instruction for triggering the terminal device to enter the RRC connected state sent by the network side device, and to activate or deactivate the uplink positioning reference signal, so that the delay can be further reduced, and the uplink positioning reference signal can be quickly activated or deactivated.

S112B: an uplink positioning reference signal is activated or deactivated based on the activation command or the deactivation command.

S112B has the same or similar technical effects as S112 in the above embodiment, and the description of the specific implementation of S112B may refer to the description of the specific implementation of S112 in the foregoing embodiment, and details are not described herein again.

Figure 10:
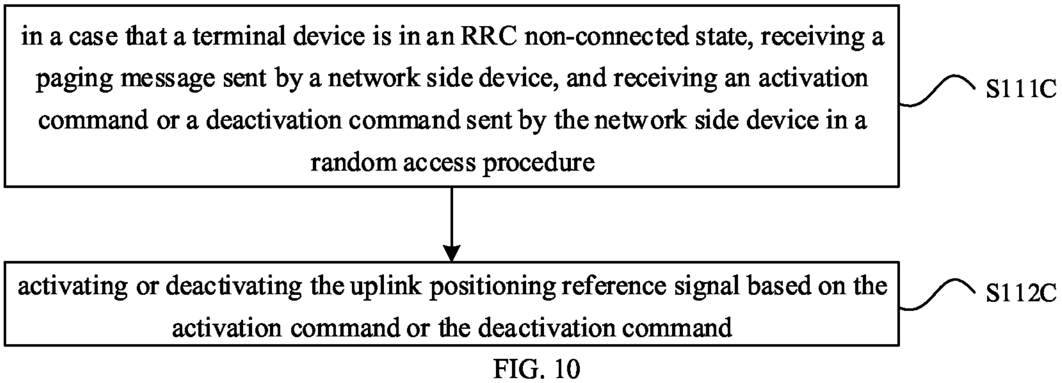
FIG. 10 is a flowchart of a positioning method according to another embodiment of the present disclosure.

Referring to FIG. 10, FIG. 10 is a flowchart of a positioning method according to another embodiment of the present disclosure.

As shown in FIG. 10, the method is applied to a terminal device, and the method may include, but is not limited to, the following steps.

S111C: in a case that the terminal device is in an RRC non-connected state, a paging message sent by a network side device is received, and an activation command or a deactivation command sent by the network side device is received in a random access procedure.

It may be understood that when the terminal device is in the RRC non-connected state, in general, the network side device cannot directly send the activation command or deactivation command of an uplink positioning reference signal to the terminal device.

Based on this, in the embodiment of the present disclosure, the terminal device receives the paging message sent by the network side device, receives the activation command or the deactivation command sent by the network side device in the random access procedure, and activates or deactivates the uplink positioning reference signal, so as to position the terminal device. In this process, the time delay can be further reduced without sending the activation command or the deactivation command after the terminal device is in the RRC connected state, thereby realizing quick activation or deactivation of the uplink positioning reference signal.

In an exemplary embodiment, in the random access procedure of the terminal device, the terminal device may receive the activation command or the deactivation command sent by the network side device through an MSG2 or an MSG4, or receive the activation command or the deactivation command sent by the network side device through an MSGB.

In the embodiments of the present disclosure, in a 2-step random access procedure, the terminal device may receive the activation command or the deactivation command sent by the network side device through the MSGB. In the embodiments of the present disclosure, in a 4-step random access procedure, the terminal device may receive the activation command or the deactivation command sent by the network side device through the MSG2 or MSG4.

In an exemplary embodiment, receiving the activation command or the deactivation command sent by the network side device further includes: in a case that the terminal device does not have an ongoing uplink SDT, receiving a paging message sent by the network side device, and receiving the activation command or the deactivation command sent by the network side device in the random access procedure.

In the case that the terminal device does not have the ongoing uplink SDT, a specific manner in which the terminal device receives the paging message sent by the network side device and receives the activation command or the deactivating command sent by the network side device in the random access procedure can refer to the above related discussion that the terminal device receives the paging message sent by the network side device and receives the activation command or the deactivation command sent by the network side device in the random access procedure, which will not be repeated here.

S112C: an uplink positioning reference signal is activated or deactivated based on the activation command or the deactivation command.

S112C has the same or similar technical effects as S112 in the above embodiment, and the description of the specific implementation of S112C may refer to the description of the specific implementation of S112 in the foregoing embodiment, and details are not described herein again.

In some embodiments, the positioning method further includes: receiving a positioning capability request message sent by an LMF device, in which the positioning capability request message is used to at least request for a type and/or a movement state of the terminal device.

It can be understood that the uplink positioning reference signal of the terminal device is specific, and is an uplink positioning reference signal configured for the terminal device by a serving cell where the terminal device is located. For example, the network side device may use an RRC release message to configure for the terminal device the uplink positioning reference signal for the terminal device in the RRC non-connected state. However, due to a movement of the terminal device, for example, the terminal device moves beyond a range of the serving cell, the uplink positioning reference signal configured for the terminal device may lose efficacy. In this case, the network side device cannot position the terminal device by using the uplink positioning reference signal configured for the terminal device, that is, it is not suitable to use the uplink positioning method to position the terminal device with a fast movement speed.

In addition, the type of the terminal device may also reflect the movement state of the terminal, for example, a certain type of terminal device, such as an industrial internet of things (IIoT) terminal device, has a small movement speed and a limited movement range. If the network side device configures for the IIoT terminal device the uplink positioning reference signal for the RRC non-connected state, usually the uplink positioning reference signal does not lose efficacy. Therefore, when such type of terminal device is in the RRC non-connected state, the uplink positioning method is also applicable.

It should be noted that, the method using the RRC release message to configure the uplink positioning reference signal for the terminal device may also be related to other conditions of the terminal device, and may be set according to needs, which is not limited in the present disclosure.

Based on this, in the embodiments of the present disclosure, the terminal device receives the positioning capability request information sent by the LMF device for at least requesting the type and the movement state of the terminal device, so as to obtain the type and/or the movement state of the terminal device.

The positioning capability request message is an LPP request capabilities message.

In some embodiments, the terminal device sends the type and/or the movement state of the terminal device to the LMF device according to the positioning capability request message.

In the embodiments of the present disclosure, after receiving the positioning capability request message sent by the LMF device, the terminal device sends the type and/or the movement state of the terminal device to the LMF device according to the positioning capability request message, so that it may be determined whether the uplink positioning method is applicable when the terminal device is in the RRC non-connected state. In the case that the uplink positioning method is applicable, the terminal device is positioned by using the method, so as to improve an accuracy of positioning the terminal device.

In the embodiment of the present disclosure, the type and/or movement state of the terminal device sent by the terminal device to the LMF device is included in an LPP provide capabilities message.

In the embodiments provided in the present disclosure, the methods provided are introduced from the perspective of the network side device and the terminal device, respectively. In order to implement functions in the methods provided in the embodiments of the present disclosure, the network side device and the terminal device may include a hardware structure and a software module to implement the functions in the forms of the hardware structure, the software module, or a combination of the hardware structure and the software module. Some of the functions may be performed in the hardware structure, the software module, or a combination of the hardware structure and the software module.

Figure 11:
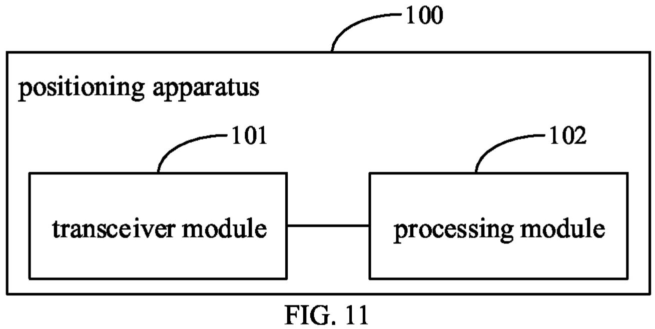
FIG. 11 is a block diagram of a communication apparatus according to an embodiment of the present disclosure.

Referring to FIG. 11, FIG. 11 is a block diagram of a positioning apparatus 100 provided in an embodiment of the present disclosure. The positioning apparatus 100 shown in FIG. 11 may include a transceiver module 101 and a processing module 102. The transceiver module 101 may include a sending module and/or a receiving module. The sending module is configured to implement a sending function. The receiving module is configured to implement a receiving function. The transceiver module 101 may implement the sending function and/or the receiving function.

The positioning apparatus 100 may be a terminal device, or may be an apparatus in the terminal device, or may be an apparatus that can be used with the terminal device. Alternatively, the positioning apparatus 100 may be a network side device, or may be an apparatus in the network device, or may be an apparatus that can be used with the network device.

The positioning apparatus 100 is a network side device, the transceiver module 101 is configured to receive an instruction for activating or deactivating an uplink positioning reference signal sent by an LMF device; and the processing module 102 is configured to send an activation command or a deactivation command to a terminal device in an RRC non-connected state based on the instruction for activating or deactivating the uplink positioning reference signal.

Or, the transceiver module 101 is configured to receive a positioning information request message sent by an LMF device for instructing or requesting the network side device to configure an uplink positioning reference signal for a terminal device; the processing module 102 is configured to configure the uplink positioning reference signal for the terminal device based on the positioning information request message; if the uplink positioning reference signal is not successfully configured for the terminal device within a preset duration, send a second error indication message to the LMF device. The uplink positioning reference signal is applied to a terminal device in an RRC non-connected state.

The positioning apparatus 100 is a terminal device, the transceiver module 101 is configured to receive an activation command or a deactivation command sent by a network side device in a case that the terminal device is in an RRC non-connected state; and the processing module 102 is configured to activate or deactivate an uplink positioning reference signal based on the activation command or the deactivation command.

With regard to the positioning apparatus 100 in the above embodiments, the specific way in which each module performs the operation has been described in detail in the embodiments of the method and will not be elaborated here. The positioning apparatus 100 provided in the foregoing embodiments of the present disclosure has the same or similar beneficial effects as the positioning method provided in some embodiments above, and details are not described herein again.

Figure 12:
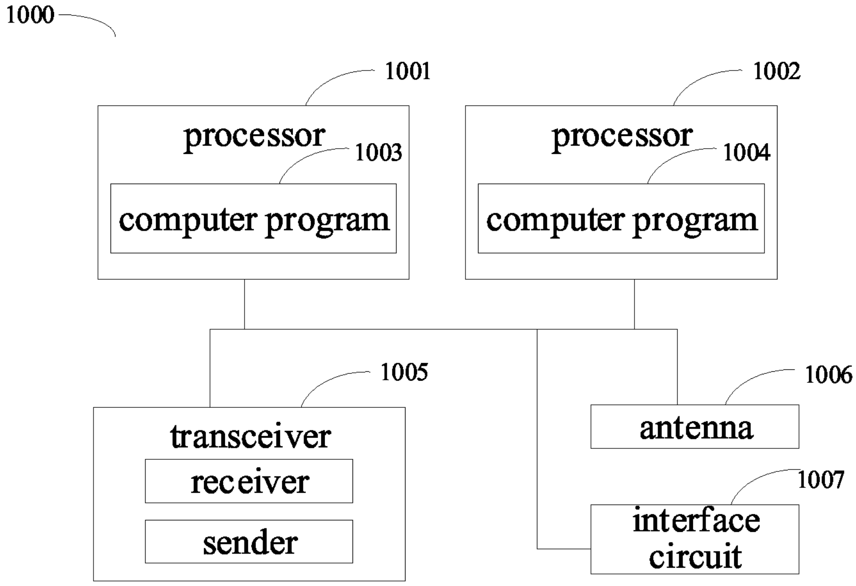
FIG. 12 is a block diagram of a communication apparatus according to another embodiment of the present disclosure.

Referring to FIG. 12, FIG. 12 is a block diagram of a communication apparatus 1000 provided in in an embodiment of the present disclosure. The communication apparatus 1000 may be a terminal device (for example, a terminal device in the foregoing method embodiments), or may be a chip, a chip system, or a processor that supports the terminal device to implement the foregoing methods. The apparatus may be used to implement the methods described in the above method embodiments, and reference can be made to the description in the foregoing method embodiments.

The communications apparatus 1000 may include one or more processors 1001. The processor 1001 may be a general-purpose processor or a dedicated processor or the like. For example, it may be a baseband processor or a central processor. The baseband processor may be configured to process a communication protocol and communication data. The central processor may be configured to control the communication apparatus (for example, a base station, a baseband chip, a terminal device, a terminal device chip, a DU, or a CU), execute a computer program, and process data of a computer program.

Optionally, the communications apparatus 1000 may further include one or more memories 1002 on which a computer program 1004 may be stored, and the memory 1002 executes the computer program 1004, so that the communications apparatus 1000 performs the method described in any of the above method embodiments. Optionally, the memory 1002 may further store data. The communications apparatus 1000 and the memory 1002 may be separately disposed, or may be integrated together.

Optionally, the communications apparatus 1000 may further include a transceiver 1005 and an antenna 1006. The transceiver 1005 may be referred to as a transceiver unit, a transceiver, or a transceiver circuit, and is configured to implement a transceiver function. The transceiver 1005 may include a receiver and a sender, and the receiver may be referred to as a receiving circuit, for implementing a receiving function; and the sender may be referred to as a transmitter or a sending circuit, for implementing a sending function.

Optionally, the communications apparatus 1000 may further include one or more interface circuits 1007. The interface circuit 1007 is configured to receive code instructions and transmit the code instructions to the processor 1001. The processor 1001 executes the code instructions to cause the communication apparatus 1000 to perform the method described in any of the foregoing method embodiments.

The communication apparatus 1000 is a network side device, the transceiver 1005 is configured to perform S1 in FIG. 2; S1A in FIG. 3; S1 B in FIG. 4; SIC in FIG. 5; or S11 in FIG. 3. The processor 1001 is configured to perform S2 in FIG. 2; S2 A in FIG. 3; S2B in FIG. 4; S2C in FIG. 5; or S12 in FIG. 3.

The communication apparatus 1000 is a terminal device, the transceiver 1005 is configured to perform S111 in FIG. 4; S111A in FIG. 5; S111B in FIG. 6; and S111C in FIG. 7. The processor 1001 is configured to execute S112 in FIG. 4; S112 A in FIG. 5; S112B in FIG. 6; S112C in FIG. 7.

In an implementation, the processor 1001 may include a transceiver configured to implement receiving and sending functions. For example, the transceiver may be a transceiver circuit, an interface, or an interface circuit. The transceiver circuit for implementing the receiving and sending functions, the interface, or the interface circuit may be separate or integrated together. The transceiver circuit, the interface, or the interface circuit may be used for reading and writing code/data, or the transceiver circuit, the interface, or the interface circuit may be used for signal transmission.

In an implementation, the processor 1001 may store a computer program 1003, and the computer program 1003 runs on the processor 1001, so that the communication apparatus 1000 may perform the method described in the above method embodiments. The computer program 1003 may be cured in the processor 1001, and in this case, the processor 1001 may be implemented by a hardware.

In an implementation, the communication apparatus 1000 may include a circuit, and the circuit may implement a function of sending or receiving or communicating in the above method embodiments. The processor and the transceiver described in the present disclosure may be implemented on an integrated circuit (IC), an analog IC, a radio frequency integrated circuit RFIC, a mixed signal IC, an application specific integrated circuit (ASIC), a printed circuit board (PCB), an electronic device, etc. The processor and the transceiver may also be manufactured using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), and the like.

The communication apparatus described in the above embodiments may be a terminal device (for example, a terminal device in the foregoing method embodiment), but the scope of the communication apparatus described in this disclosure is not limited thereto, and the structure of the communication apparatus may not be limited by FIG. 12. The communication apparatus may be a stand-alone device or may be part of a larger device. For example, the communication apparatus may be:

(1) an independent integrated circuit (IC), a chip, or a chip system or subsystem;

(2) an IC set having one or more ICs, optionally, the IC set may also include a storage component for storing data and a computer program;

(3) an ASIC, such as a modem (modem);

(4) modules that may be embedded in other devices;

(5) a receiver, a terminal device, an intelligent terminal device, a cellular phone, a wireless device, a handset, a mobile unit, a vehicle-mounted device, a network device, a cloud device, an artificial intelligence device, and the like;

(6) Others.

Figure 13:
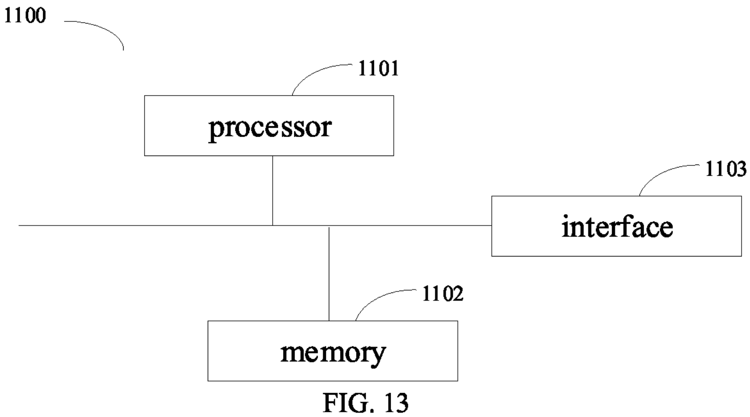
FIG. 13 is a block diagram of a chip according to an embodiment of the present disclosure.

For a case where the communication apparatus may be a chip or a chip system, please refer to FIG. 13, which is a block diagram of a chip provided in an embodiment of the present disclosure.

As shown in FIG. 13, the chip 1100 includes a processor 1101 and an interface 1103. The number of processors 1101 may be one or more, and the number of interfaces 1103 may be more than one.

The chip is used to implement the function of the network side device in the embodiments of the present disclosure.

The interface 1103 is configured to receive code instructions and transmit the code instructions to the processor.

The processor 1101 is configured to execute the code instructions to perform the positioning method according to any of the above embodiments.

The chip is used to implement the function of the terminal device in the embodiments of the present disclosure.

The interface 1103 is configured to receive code instructions and transmit the code instructions to the processor.

The processor 1101 is configured to execute the code instructions to perform the positioning method according to any of the above embodiments.

Optionally, the chip 1100 further includes a memory 1102, and the memory 1102 is configured to store necessary computer programs and data.

Those skilled in the art may also understand that the various illustrative logical blocks and steps listed in the embodiments of the present disclosure may be implemented by electronic hardware, computer software, or a combination of the two. Such a function is implemented by a hardware or a software depending on the particular application and the design requirements of the entire system. Those skilled in the art may implement the functions by using various methods for each specific application, but it should not be understood that the implementation goes beyond the scope of protection of the embodiments of the present disclosure.

The present disclosure further provides a readable storage medium having stored thereon instructions that, when executed by a computer, implement the functions of any of the foregoing method embodiments.

The present disclosure further provides a computer program product, which, when executed by a computer, implements the functions of any one of the above method embodiments.

In the above embodiments, all or some of the above may be implemented by a software, a hardware, a firmware, or any combination thereof. When implemented using the software, all or some of the above may be implemented in the form of a computer program product. The computer program product includes one or more computer programs. When the computer program is loaded and executed on a computer, the processes, or functions according to the embodiments of the present disclosure are all or partially generated. The computer may be a general-purpose computer, a special purpose computer, a computer network, or other programmable apparatus. The computer program may be stored in a computer-readable storage medium or transmitted from a computer-readable storage medium to another computer-readable storage medium, for example, the computer program may be transmitted from a website site, a computer, a server, or a data center to another website site, another computer, another server, or another data center in a wired (e.g., a coaxial cable, an optical fiber, a digital subscriber line (DSL)), or wireless (e.g., infrared, wireless, microwave, etc.). The computer-readable storage medium may be any usable medium accessible by a computer, or a data storage device, such as a server including one or more data storage devices, or a data center. The usable medium may be a magnetic medium (for example, a floppy disk, a hard disk, or a magnetic tape), an optical medium (for example, a high-density digital video disc (DVD)), or a semiconductor medium (for example, a solid state disk (SSD)), etc.

Unless the context requires otherwise, in the entire specification and claims, the terms "comprises" and other forms such as "comprises" and "comprising" are interpreted as open, inclusive, i.e., "including, but not limited to" In the description of the specification, the terms "some embodiments", "exemplary embodiments" and the like are intended to indicate that a particular feature, structure, material, or characteristic related to the embodiment or example is included in at least one embodiment or example of the present disclosure. The schematic representation of the above terms does not necessarily refer to the same embodiment or example. Furthermore, the specific features, structures, materials, or characteristics may be included in any suitable manner in any one or more embodiments or examples.

Those ordinary skill in the art may understand that the first, second and other digital numbers involved in the present disclosure are only a convenient distinction for description, and are not used to limit the scope of the embodiments of the present disclosure, and represent the sequence.

The term "at least one" used in the present disclosure may also be represented as one or more, "a plurality of" may refer to two, three, four or more, which is not limited in the present disclosure. In the embodiments of the present disclosure, for one technical feature, the technical features in such technical feature are distinguished by "first", "second", "third", "A", "B", "C", "D", etc., and the technical features described by "first", "second", "third", "A", "B", "C" and "D" have no sequential or size order. "A and/or B" includes the following three combinations: only A, only B, and a combination of A and B.

A person of ordinary skill in the art may be aware that units and algorithm steps of the examples described in connection with the embodiments disclosed herein can be implemented by an electronic hardware, or a combination of computer software and an electronic hardware. Whether the functions are performed by hardware or software depends on specific applications and design constraint conditions of the technical solutions. Those skilled in the art may use different methods to implement the described functions for each specific application, but it should not be considered that the implementation goes beyond the scope of the present disclosure.

Those skilled in the art may clearly understand that, for the convenience and brevity of description, the described system, apparatus, and specific working process of the unit may refer to a corresponding process in the above method embodiments, and details are not described herein again.

The above is merely a specific embodiment of the present disclosure, but the scope of protection of the present disclosure is not limited thereto, and any person skilled in the art may easily conceive of changing or replacing within the technical scope disclosed in the present disclosure, and should be covered within the scope of protection of the present disclosure. Therefore, the protection scope of the present disclosure shall be subject to the protection scope of the claims.

What is claimed is:

1. A positioning method, performed by a network device, and comprising:

receiving an instruction for activating or deactivating an uplink positioning reference signal sent by a location management function (LMF); and sending an activation command or a deactivation command to a terminal in a radio resource control (RRC) non-connected state based on the instruction for activating or deactivating the uplink positioning reference signal, wherein the terminal has an ongoing uplink small data transmission (SDT); and after sending the activation command or the deactivation command to the terminal, the terminal is controlled to be in the RRC non-connected state.

2. The method of claim 1, wherein sending the activation command or the deactivation command to the terminal in the RRC non-connected state comprises:

sending the activation command or the deactivation command to the terminal after triggering the terminal to enter an RRC connected state.

3. The method of claim 1, wherein sending the activation command or the deactivation command to the terminal in the RRC non-connected state comprises:

sending a paging message to the terminal, and sending the activation command or the deactivation command to the terminal in a random access procedure of the terminal.

4. The method of claim 1, wherein, before receiving the instruction for activating or deactivating the uplink positioning reference signal sent by the LMF, the method further comprises:

receiving an indication message sent by the LMF; and configuring the uplink positioning reference signal for the terminal based on the indication message, wherein the uplink positioning reference signal is an aperiodic or semi-persistent signal.

5. The method of claim 4, wherein the indication message comprises a preset duration, wherein the preset duration is a longest time period required by the network device to successfully configure the uplink positioning reference signal for the terminal.

6. The method of claim 5, further comprising:

sending a first error indication message to the LMF in response to the network device failing to configure the uplink positioning reference signal for the terminal within the preset duration.

7. The method of claim 6, wherein the first error indication message comprises a first cause value; wherein the first cause value indicates that the terminal does not enter the RRC non-connected state within the preset duration.

8. A positioning method, performed by a network device, and comprising:

receiving a positioning information request message sent by a location management function (LMF) for instructing or requesting the network device to configure an uplink positioning reference signal for a terminal;

configuring the uplink positioning reference signal for the terminal based on the positioning information request message; and sending a second error indication message to the LMF, wherein the uplink positioning reference signal is failed to be configured for the terminal within a preset duration, wherein the uplink positioning reference signal is performed by the terminal in a radio resource control (RRC) non-connected state.

9. A positioning method, performed by a terminal, and comprising:

receiving an activation command or a deactivation command sent by a network device, wherein the terminal is in a radio resource control (RRC) non-connected state, wherein the terminal has an ongoing uplink small data transmission (SDT); and activating or deactivating an uplink positioning reference signal based on the activation command or the deactivation command; and after receiving the activation command or the deactivation command, the terminal is controlled to be in the RRC non-connected state.

10. The method of claim 9, wherein receiving the activation command or the deactivation command sent by the network device further comprises:

receiving an instruction for triggering the terminal to enter an RRC connected state sent by the network device;

entering the RRC connected state; and receiving the activation command or the deactivation command sent by the network device.

11. The method of claim 9, wherein receiving the activation command or the deactivation command sent by the network device comprises:

receiving a paging message sent by the network device, and receiving the activation command or the deactivation command sent by the network device in a random access procedure.

12. The method of claim 9, further comprising:

receiving a positioning capability request message sent by a location management function (LMF), wherein the positioning capability request message is configured to at least request for at least one of a type or a movement state of the terminal.

13. The method of claim 12, further comprising:

sending the at least one of the type or the movement state of the terminal to the LMF based on the positioning capability request message.

* * * * *